US012657659B2

(12) United States Patent
Eser

(10) Patent No.: US 12,657,659 B2
(45) Date of Patent: Jun. 16, 2026

(54) METHOD OF HIGH-QUALITY VIDEO SCALING WITH REAL-TIME X-MODEL/PLUS-MODEL FILTER ON FIELD PROGRAMMABLE GATE ARRAY(FPGA)

(71) Applicant: ASELSAN ELEKTRONIK SANAYI VE TICARET ANONIM SIRKETI, Ankara (TR)

(72) Inventor: Salih Eser, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 441 days.

(21) Appl. No.: 18/557,600

(22) PCT Filed: Jun. 28, 2022

(86) PCT No.: PCT/TR2022/050672
§ 371 (c)(1),
(2) Date: Oct. 27, 2023

(87) PCT Pub. No.: WO2023/282876
PCT Pub. Date: Jan. 12, 2023

(65) Prior Publication Data
US 2024/0212094 A1      Jun. 27, 2024

(30) Foreign Application Priority Data

Jul. 6, 2021    (TR) ............................... 2021/011002

(51) Int. Cl.
*G06T 3/4053* (2024.01)
*G06T 3/4007* (2024.01)
*G06T 5/20* (2006.01)

(52) U.S. Cl.
CPC .......... *G06T 3/4053* (2013.01); *G06T 3/4007* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 2003/0194009 A1* | 10/2003 | Srinivasan | ............. | H04N 19/52 382/107 |
| 2008/0031538 A1* | 2/2008 | Jiang | ......................... | G06T 5/73 348/E5.064 |

(Continued)

FOREIGN PATENT DOCUMENTS

WO      WO-2011010475 A1 *    1/2011    ............... G06T 5/70

OTHER PUBLICATIONS

Anju Sudhakaran, High-Quality Image Scaling Using V-Model, 2018 International Conference on Circuits and Systems in Digital EnterpriseTechnology (ICCSDET), 2018, pp. 1-4.

(Continued)

*Primary Examiner* — Jiangeng Sun
(74) *Attorney, Agent, or Firm* — Bayramoglu Law Offices LLC

(57)                ABSTRACT

A method of obtaining X-Model/Plus-Model filter by combining and then mathematical reducing SSF (Sharpening Spatial Filter) and CF (Clamp Filter) and scaling high quality video with this filter in real time on field programmable gate array (FPGA) is provided. With the method, the developed X-Model/Plus-Model filter was applied before the application of interpolation to increase the quality of the scaled video. The said filter is applied in real time with advantages such as low computational complexity, low memory requirement, low power and low resource consumption, and high operating frequency.

2 Claims, 5 Drawing Sheets

(56) References Cited

U.S. PATENT DOCUMENTS

2013/0028538 A1 * 1/2013 Simske ................ G06T 3/4007
                                                382/300
2013/0182780 A1 * 7/2013 Alshin ................ H04N 19/182
                                                382/264
2021/0042894 A1   2/2021 Yelton

OTHER PUBLICATIONS

Shih-Lun Chen, et al., A Low-Cost High-Quality Adaptive Scalar
for Real-Time Multimedia Applications, IEEE Transactions on
Circuits and Systems for Video Technology, 2011, pp. 1600-1611,
vol. 21, No. 11.
C. John Moses, et al., VLSI Architectures for Image Interpolation:
A Survey, VLSI Design, 2014, pp. 1-10.

* cited by examiner

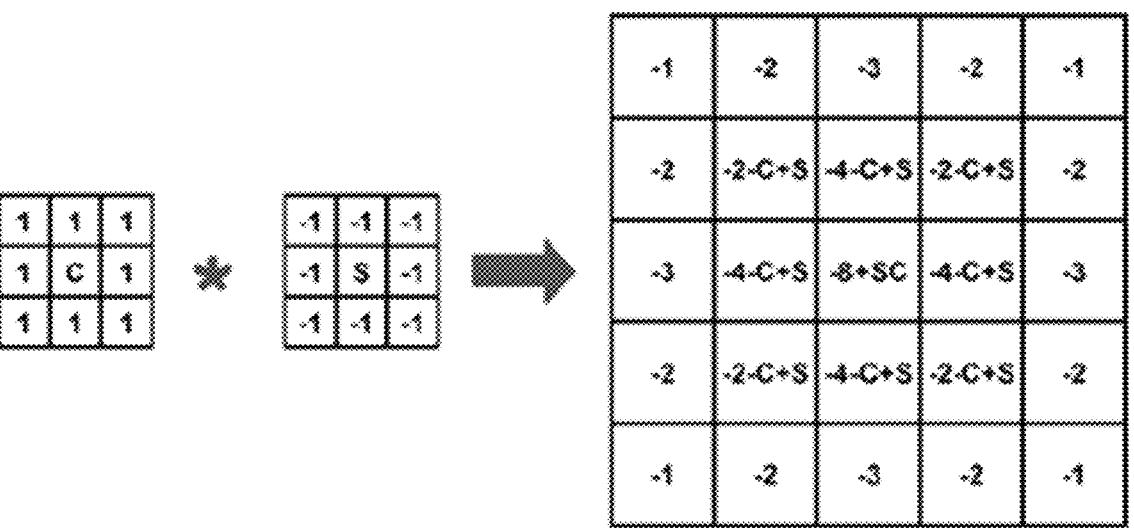
FIG. 1
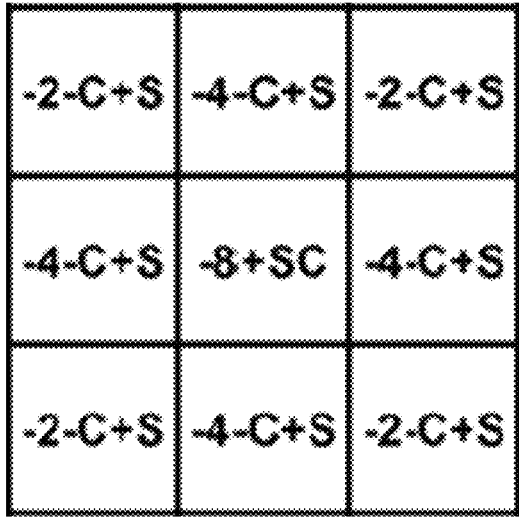
FIG. 2
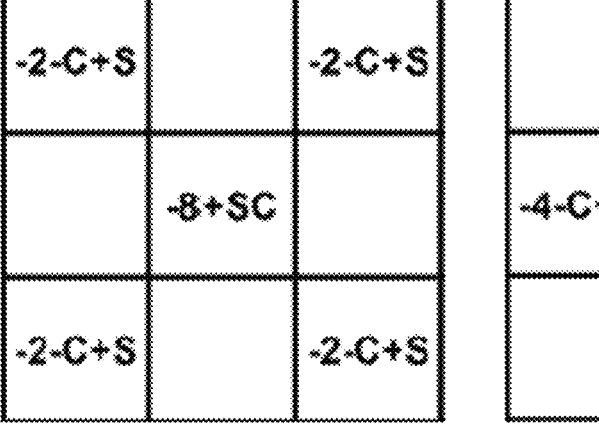
FIG. 3A                    FIG. 3B

FIG. 5A                              FIG. 5B

FIG. 6A
FIG. 6B
FIG. 6C

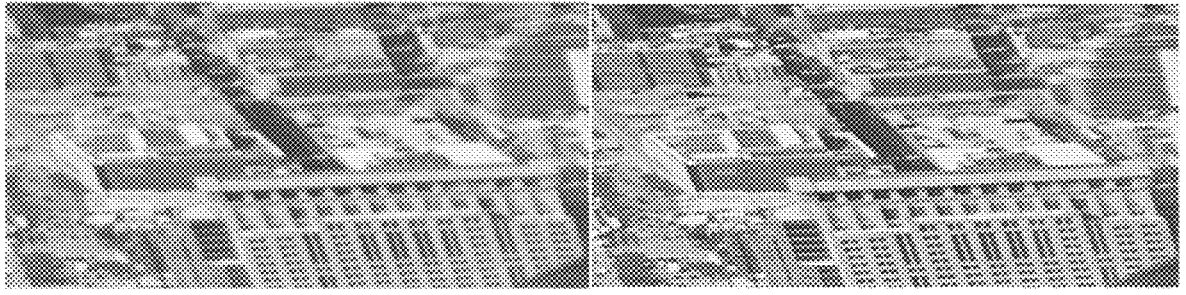
FIG. 7A                           FIG. 7B
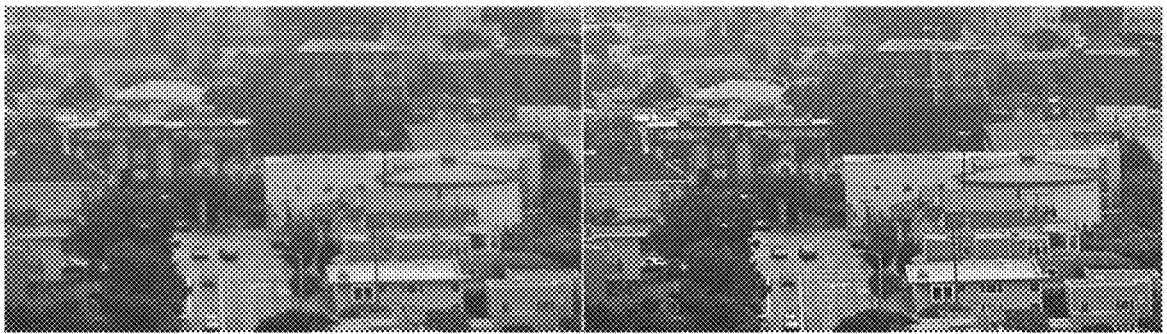
FIG. 8A                           FIG. 8B

METHOD OF HIGH-QUALITY VIDEO SCALING WITH REAL-TIME X-MODEL/PLUS-MODEL FILTER ON FIELD PROGRAMMABLE GATE ARRAY(FPGA)

CROSS REFERENCE TO THE RELATED APPLICATIONS

This application is the national phase entry of International Application No. PCT/TR2022/050672, filed on Jun. 28, 2022, which is based upon and claims priority to Turkish Patent Application No. 2021/011002, filed on Jul. 6, 2021, the entire contents of which are incorporated herein by reference.

TECHNICAL FIELD

The invention relates to methods of obtaining X-Model/Plus-Model filter by combining SSF (Sharpening Spatial Filter) and CF (Clamp Filter) and scaling high quality video with this filter in real time on field programmable gate array (FPGA).

BACKGROUND

In recent years, video scaling methods have become increasingly important as a result of the increase in video resolutions (2K, 4K, 8K, etc.) and video quality. The methods proposed in recent years mainly include deep learning and machine learning methods. Implementation of these methods in FPGA and/or real-time implementation in embedded systems causes computational complexity and significant amount of resource consumption. When it is desired to obtain a high-resolution video from a low-resolution video, bilinear interpolation appears as one of the most frequently used methods. After the application of bilinear interpolation, blur effect and aliasing artifact are seen in the video.

In the state of art, an image processing method used in aerial refueling aircraft is disclosed in the application numbered US2021042894A1. The method is based on the application of contrast limited adaptive histogram equalization technique (CLAHE), which is a local image processing technique, on FPGA. When applying CLAHE, the image is divided into tiles of different sizes. After the required operations, these tiles are combined to obtain the final image with the same resolution. When these tiles are considered as pieces of a puzzle and brought together, interpolation is applied to smooth the transition of the image between neighboring tiles. Filtering operations are applied horizontally and vertically. The computational complexity is high, and the filter dimensions are high and there are multiple different filters. The delay calculations of the filter used are as follows.

TABLE 4

| Filter Delay Calculations in Application Number US2021042894A1 | | | |
|---|---|---|---|
| | Operating Frequency | | |
| Resolution | 100 MHz | 200 MHz | 400 MHZ |
| 1920 × 1080 | (19.2 × 8) us + 0.4 us + 1 frame delay | (9.5 × 8) us + 0.4 us + 1 frame delay | (4.75 × 8) us + 0.4 us + 1 frame delay |

TABLE 4-continued

| Filter Delay Calculations in Application Number US2021042894A1 | | | |
|---|---|---|---|
| | Operating Frequency | | |
| Resolution | 100 MHz | 200 MHz | 400 MHZ |
| 1280 × 720 | (12.8 × 8) us + 0.4 us + 1 frame delay | (6.4 × 8) us + 0.4 us + 1 frame delay | (3.2 × 8) us + 0.4 us + 1 frame delay |
| 640 × 480 | (3.2 × 8) us + 0.4 us + 1 frame delay | (1.6 × 8) us + 0.4 us + 1 frame delay | (0.8 × 8) us + 0.4 us + 1 frame delay |

The reason for ×8 overcalculation is that 3×9 and 9×3 filtering will be applied. If CLAHE is applied with read and write to DDR, +1 frame delay time should be added on it. Also, for an application like CLAHE the maximum operating frequencies can be maximum 200-225 MHz.

As a result, it was deemed necessary to make an improvement in the relevant technical field due to the disadvantages mentioned above and the inadequacy of the existing solutions on the subject due to differences in the purpose, tool, functionality and application of the methods.

SUMMARY

With the invention, the developed X-Model/Plus-Model filter is applied before the application of interpolation to increase the quality of the scaled video and eliminate the mentioned problems. In addition to providing the elimination of these effects, the filter of the invention is implemented in real time with advantages such as low computational complexity, low memory requirement, low power and low resource consumption and high operating frequency.

X-Model/Plus-Model filters are combined filters based on the convolution of two different filters. In the high-quality video scaling implemented in the FPGA in real time with the X-Model/Plus-Model filter, the main idea is based on increasing the video resolution. For example, if the incoming image has a resolution of 640×480, this is a method used to increase the quality of the video by scaling the image to 1920×1080 resolution. The incoming image is filtered through the X-Model/Plus-Model filter and then sampled to the desired higher resolution. Significant improvements have been achieved in signal-noise ratios and structural similarities of videos that are filtered through the X-Model/Plus-Model filter and then scaled to high resolution, compared to real videos.

Compared to the prior art, the invention is used when scaling video from a low resolution to a high resolution and it increases the signal noise-ratio and the structural similarity of the image to real life. The interpolation application is used to scale the video to higher resolutions. The recommended filtering process uses only 5 out of 9 pixels in a 3×3 area with single filtering. X-Model/Plus-Model filter, which is mathematically obtained by convolutional combining Sharpening Spatial Filter and Clamp Filter and then reduction of the result is made and optimized values that work best.

The structural and characteristic features of the invention and all its advantages will be understood more clearly by means of the figures given below and the detailed explanation written with reference to these figures.

BRIEF DESCRIPTION OF THE DRAWINGS

FIG. 1 shows the combined filter obtained by the convolution of 3×3 SSF and 3×3 CF.

FIG. 2 shows the cut off 3×3 area which obtained by cutting 5×5 convolutional filter starting from (2,2) position.

FIGS. 3A-3B show the X-Model filter created by setting the coefficients (1,2), (2,1), (2,3) and (3.2) to zero of the cut off 3×3 area and the Plus-Model filter created by setting the coefficients (1,1), (1,3), (3,1) and (3,3) to zero of the cut off 3×3 area.

FIGS. 5A-5B are the view after the mathematical variable change and simplification applied in the filters FIGS. 6A-6C show images obtained by doubling the resolution of video frames of different resolutions.

FIGS. 7A-7B show the differences of results between 1080p (FHD) video frame to 1440p (2K) scaling and background details.

FIGS. 8A-8B show the differences of results between 1080p (FHD) video frame to 2160p (4K) scaling and background details.

Figures 4A, 4B, 4C, 4D:
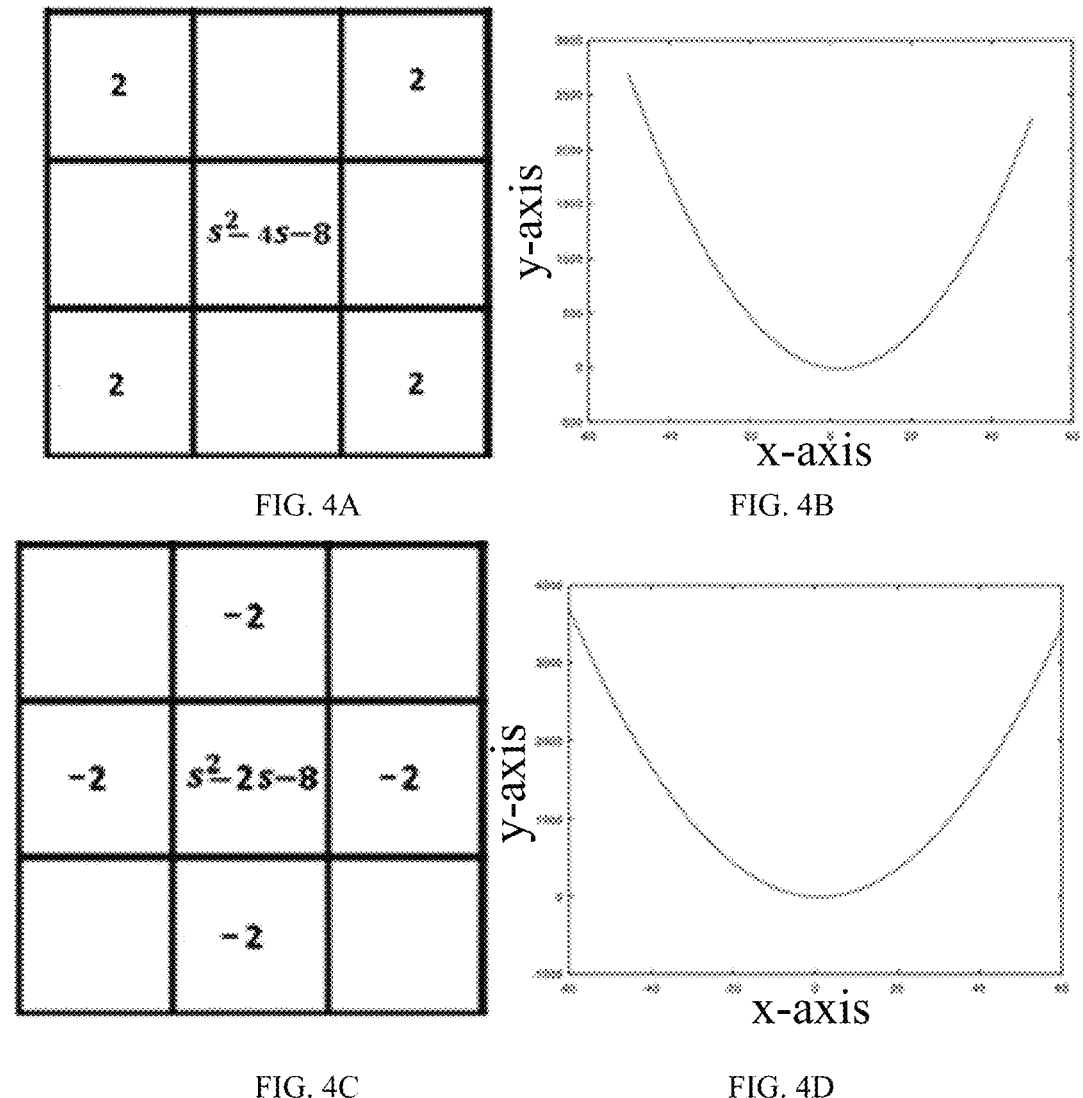
FIGS. 4A-4D show the filters obtained when S−4 is written instead of C for the X-Model and S−2 is written instead of C for the Plus-Model and the graphs of the quadratic equations in the range [−60 60].

The figures are not necessarily to scale and details not necessary for understanding the present invention may have been omitted.

DETAILED DESCRIPTION OF THE EMBODIMENTS

In this detailed description, the preferred embodiments of the invention are described only for a better understanding of the subject and without causing any limiting effect.

The developed X-Model/Plus-Model filter is basically obtained by combining SSF (Sharpening Spatial Filter) and CF (Clamp Filter). To summarize these two filters briefly: SSF is a type of high-pass filter. It enhances the details in the image. It increases the center pixel density by using neighboring pixels to increase the brightness in a specified area. The reason for using it here is to increase the definition between brightness and darkness.

$$SSF = \begin{bmatrix} -1 & -1 & -1 \\ -1 & S & -1 \\ -1 & -1 & -1 \end{bmatrix}$$

CF is a type of low pass filter. It is known as a convolutional filter, which removes the distorting effects and unwanted gapping edges in the image. In frequent use of the filter, it is seen that the perimeter of the center pixel is completely surrounded by ones.

$$CF = \begin{bmatrix} 1 & 1 & 1 \\ 1 & C & 1 \\ 1 & 1 & 1 \end{bmatrix}$$

High-resolution images are often created using large-size convolutional filters. However, the increase in filter size increases the memory and thus the hardware cost. 3×3 filters have low computational complexity. Combined filters can be considered as one-time application of filters that are applied in succession.

The steps for obtaining the X-Model/Plus-Model filter are as follows:

The 5×5 combined filter in FIG. 1 is obtained by the convolution of 3×3 SSF and 3×3 CF.

The 3×3 area of the 5×5 filter is cut out starting from the position (2, 2).

To obtain the X-Model filter, setting −4−C+S=0 at (1, 2), (2, 1), (2, 3) and (3, 2) positions of the 3×3 filter, these coefficients are set to zero and the equation C=S−4 is obtained. The filter becomes as shown in FIG. 3A. To obtain the Plus-Model filter as shown in FIG. 3B, setting −2−C+S=0 at (1, 1), (1, 3), (3, 1) and (3, 3) positions of the 3×3 filter, these coefficients are set to zero and the equation C=S−2 is obtained.

For X-Model, S−4 is written instead of C. For Plus-Model, S−2 is written instead of C. For both filters, a quadratic equation is obtained at position (2, 2). In FIGS. 4A-4D, the graphs of the obtained filters and the quadratic equations in the range [−60 60] are given, with FIGS. 4A-4B being for the X-Model filter and FIGS. 4C-4D being for the Plus-Model filter.

Figure 5A:
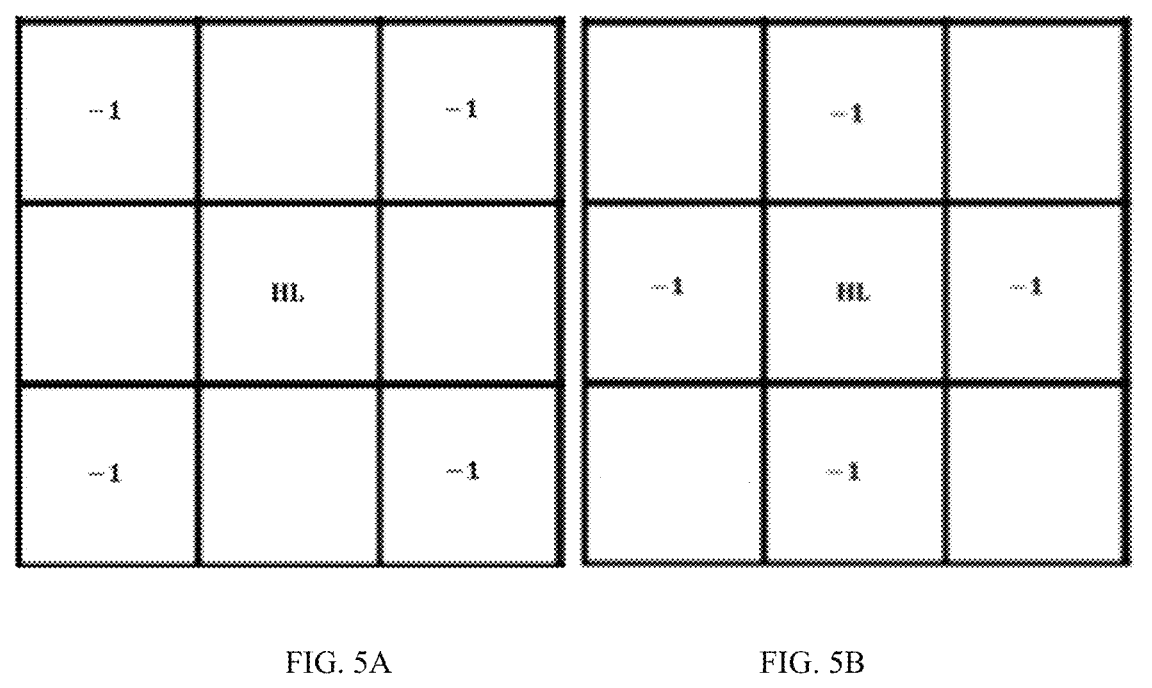

For X-Model filter, variable change is made, and necessary simplification is carried out in the equation $S^2−4S−8=−2HL$. For Plus-Model filter the equation $S^2−2S−8=2HL$ is used. FIGS. 5A-5B shows the filters after variable change and simplification.

Finally, because the combined filter is obtained by convolution operation, it will be amplified by the gains of the SSF and CF filters. To compensate for this gain value, the gain value is set as (H−3)*(L+3). Another method may be used to compensate for the gain values. The developed X-Model filter is in the form given below:

$$XF = \begin{bmatrix} -1 & 0 & -1 \\ 0 & H*L & 0 \\ -1 & 0 & -1 \end{bmatrix} \Big/ ((H-3)*(L+3)) =$$

$$\begin{bmatrix} -1/((H-3)*(L+3)) & 0 & -1/((H-3)*(L+3)) \\ 0 & H*L/((H-3)*(L+3)) & 0 \\ -1/((H-3)*(L+3)) & 0 & -1/((H-3)*(L+3)) \end{bmatrix}$$

The developed Plus-Model filter is in the form given below:

$$PF = \begin{bmatrix} 0 & -1 & -1 \\ -1 & H*L & -1 \\ 0 & -1 & 0 \end{bmatrix} \Big/ ((H-3)*(L+3)) =$$

$$\begin{bmatrix} 0 & -1/((H-3)*(L+3)) & 0 \\ -1/((H-3)*(L+3)) & H*L/((H-3)*(L+3)) & -1/((H-3)*(L+3)) \\ 0 & -1/((H-3)*(L+3)) & 0 \end{bmatrix}$$

In the increasing values of the H*L value as positive integers, the S and C parameters will be obtained as complex roots after integers greater than 6 in the X-Model filter; in the Plus-Model filter, this same effect will be seen at values smaller than −4 in the decreasing values of the H*L value as negative integers. In other words, the responses of the two filters in the same operating ranges are different from each other. In addition, it should be noted that while S−C=4 in obtaining the X-Model filter, S−C=2 in the Plus-Model filter.

In order to apply a 3×3 filter on real-time video, 3×3× 3=27 multiplication/division operations and 3×3×3=27 addition/subtraction operations are required in the calculation to be made for each pixel in the RGB color space. When the same operation is done in the YCbCr color space, it is sufficient to apply the filter only on the Y(luma) values. Therefore, 9 multiplication/division and 9 addition/subtraction operations will be required for each pixel. Thus, the computational complexities are reduced by ⅓.

In a 3×3 filter, a total of 9 pixels will be processed in the time domain. In an X-Model/Plus-Model filtering, a total of 5 pixels are processed. In other words, the total workload is reduced to 5 multiplication/division and 5 addition/subtraction operations. If the multiplication/division operations to be applied on FPGA are 2 and/or multiples of 2, these operations can be handled by shifting operation without multiplication/division. The design we made here is designed to be applied both with and without multiplication/division. In the application where we do not do multiplication/division, the computational complexity consists of only 5 addition/subtraction operations.

The design flow is as follows:

The video image that comes as YCbCr is taken with the control block. YCbCr here can be 4:4:4 or 4:2:2. The received image is sent to the fifo controller. The fifo controller is responsible for writing and reading video lines.

As the arrival of the second video line, the first line is read from the fifo. The second video line and the first video line read from the fifo go to the X-Model/Plus-Model calculator.

Mirroring is done on the image by using the registers suitable for the video data width with the two incoming lines. This operation is used in the boundary conditions (vertices and edges) of the video frame. The X-Model/Plus-Model calculator makes calculation on all pixels along the active area of the video frame and sends the calculation results together with the synchronous video signals to the output controller.

The output controller outputs the buffered CbCr values synchronously together with the video frame signals coming from the X-Model/Plus-Model calculator. With the bypass signal control in the output controller, X-Model/Plus-Model filter calculation can be made or the incoming video can be output without making calculation.

Bilinear interpolation is applied to scale video passing through the X-Model/Plus-Model filter.

In the experimental studies, both PSNR values and the image were evaluated from visual point of view. There are images obtained by doubling the resolution of video frames of different resolutions at FIGS. 6A-6C. The images in FIG. 6A were obtained by applying bidirectional linear interpolation only, while the images in FIGS. 6B-6C were obtained by applying bilinear interpolation after passing through the X-Model/Plus-Model filter. Table 2 shows the PSNR values of cases where different samples are scaled to two times resolution. On the left are the results of bilinear interpolation, in the middle are the results obtained with the FPGA-friendly X-Model filter coefficients (where multiplication and division operations are handled by the shift operator), and on the far right are the PSNR values of the results obtained with the FPGA-friendly Plus-Model filter coefficients for which the filter provides maximum results.

TABLE 5

| | | X - Model + Bilinear (FPGA - friendly) | Plus - Model + Bilinear (FPGA - friendly) |
|---|---|---|---|
| | Bilinear | | |
| Leaf (×2) | 31.18 dB (PSNR) 0.9001 (SSIM) | 33.60 dB (PSNR) 0.9408 (SSIM) | 33.87 dB (PSNR) 0.9462 (SSIM) |

PSNR (Peak Signal-to-Noise Ratio) and SSIM (Structural Similarity Index for Measuring Image Quality) Results by Data Sets TABLE 5-continued PSNR (Peak Signal-to-Noise Ratio) and SSIM (Structural Similarity Index for Measuring Image Quality) Results by Data Sets

| | Bilinear | X - Model + Bilinear (FPGA - friendly) | Plus - Model + Bilinear (FPGA - friendly) |
|---|---|---|---|
| Car (×2) | 32.04 dB (PSNR) 0.8365 (SSIM) | 33.32 dB (PSNR) 0.8856 (SSIM) | 32.96 dB (PSNR) 0.8806 (SSIM) |

In FIGS. 7A-7B, 1080p (1920×1080) is scaled to 1440p (2560×1440) resolution using an FHD (Full HD) image. That is, a FHD video frame is scaled to a 2K video frame. In the obtained results, sections were taken by zooming into the recorded 2K video frames to show the effect of the applied X-Model filter on the background image. In FIG. 7A, there is the result with only bilinear interpolation, while in FIG. 7B, there is the result that is passed through the X-Model filter and then bilinear interpolation is applied.

In FIGS. 8A-8B, 1080p (1920×1080) is scaled to 2160p (3840×2160) resolution using an FHD (Full HD) image. That is, a FHD video frame is scaled to a 4K video frame. In the obtained results, sections were taken by zooming in on the recorded 4K video frames to show the effect of the applied X-Model filter on the background image. In FIG. 8A there is the result only with bilinear interpolation, while in FIG. 8B there is the result that is filtered through the X-Model filter and then bilinear interpolation is applied.

Delay calculations of X-Model/Plus-Model Filter are as given below.

TABLE 6

Delay calculations of X-Model/Plus-Model Filter

| | Operating Frequency | | |
|---|---|---|---|
| Resolution | 100 MHz | 200 MHz | 400 MHZ |
| 1920 × 1080 | 19.2 us delay | 9.5 us delay | 4.75 us delay |
| 1280 × 720 | 12.8 us delay | 6.4 us delay | 3.2 us delay |
| 640 × 480 | 3.2 us delay | 1.6 us delay | 0.8 us delay |

What is claimed is:

1. A method of obtaining an X-Model and Plus-Model filter through filtrating an image to increase a video resolution of the image and scaling a real-time video on a field programmable gate array (FPGA) by combining $$SSF = \begin{bmatrix} -1 & -1 & -1 \\ -1 & S & -1 \\ -1 & -1 & -1 \end{bmatrix}$$

and $$CF = \begin{bmatrix} 1 & 1 & 1 \\ 1 & C & 1 \\ 1 & 1 & 1 \end{bmatrix}$$

filters, wherein S is a high frequency coefficient, and C is a low frequency coefficient, wherein the method comprises the following steps:

obtaining a combined filter of 5×5 by a convolution of 3×3 SSF and 3×3 CF, cutting a 3×3 area of the combined filter of 5×5 from a position (2, 2), for the X-Model filter, setting C=S−4 for a 3×3 filter to obtain $$\begin{bmatrix} 2 & 0 & 2 \\ 0 & S^2 - 4S - 8 & 0 \\ 2 & 0 & 2 \end{bmatrix},$$

for the Plus-Model filter, setting C=S−2 for a 3×3 filter to obtain $$\begin{bmatrix} 0 & -2 & 0 \\ 0 & S^2 - 2S - 8 & -2 \\ 2 & -2 & 0 \end{bmatrix},$$

for the X-Model filter, making a variable change and a simplification in an equation $S^2 - 4S - 8 = -2HL$, wherein the parameters H and L are obtained from the coefficients S and C to balance high-frequency response, low-frequency response, and gain of the X-Model and Plus-Model filter, for the Plus-Model filter, making a variable change and a simplification in an equation $S^2 - 2S - 8 = 2HL$, setting a gain value to compensate for gain values, as the combined filter is obtained by the convolution, obtaining the X-Model and Plus-Model filters by dividing simplified filters by the gain value, applying the X-Model and Plus-Model filters to the real-time video to increase the video resolution of the image.

2. The method according to claim 1, wherein the gain value is set as (H−3)*(L+3) to compensate the gain values.

* * * * *